United States Patent
Kikuchi

(10) Patent No.: US 9,344,610 B2
(45) Date of Patent: May 17, 2016

(54) COMMUNICATION DEVICE WITH INTERIOR ANTENNA

(71) Applicant: Panasonic Corporation, Osaka (JP)

(72) Inventor: Fumitaka Kikuchi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/499,314

(22) Filed: Sep. 29, 2014

(65) Prior Publication Data

US 2015/0103239 A1    Apr. 16, 2015

(30) Foreign Application Priority Data

Oct. 15, 2013 (JP) ................................. 2013-214498
Sep. 8, 2014 (JP) ................................. 2014-181930

(51) Int. Cl.
*H04N 5/225* (2006.01)
*H04N 5/232* (2006.01)
*G06F 1/16* (2006.01)

(52) U.S. Cl.
CPC ............. *H04N 5/2252* (2013.01); *H04N 5/225* (2013.01); *H04N 5/23203* (2013.01); *G06F 1/1686* (2013.01); *H04N 5/23206* (2013.01)

(58) Field of Classification Search
CPC . H04N 5/2251; H04N 5/2254; H04N 5/2258; H04N 5/2259; H04N 5/23203; G06F 1/1686
USPC ................... 348/211.1, 375, 376, 211.2, 373
See application file for complete search history.

(56) References Cited

U.S. PATENT DOCUMENTS

| | | | | |
|---|---|---|---|---|
| 2006/0087564 | A1* | 4/2006 | Kawamura | H04N 5/232 348/211.99 |
| 2011/0013372 | A1* | 1/2011 | Kang | G06F 1/1656 361/752 |
| 2011/0310572 | A1* | 12/2011 | Murakami | G06F 1/1683 361/752 |
| 2014/0063336 | A1* | 3/2014 | Choi | H04N 5/2252 348/374 |

FOREIGN PATENT DOCUMENTS

| | | |
|---|---|---|
| JP | 2005-065090 A | 3/2005 |
| JP | 2005-116862 A | 4/2005 |

* cited by examiner

*Primary Examiner* — Hung Lam
(74) *Attorney, Agent, or Firm* — Renner, Otto, Boisselle & Sklar, LLP

(57) ABSTRACT

The present disclosure provides a communication device which ensures downsizing of a whole device and a communication performance of an antenna even in a case where an exterior member is mainly made of metal. The communication device of the present disclosure includes a first exterior member made of metal, a second exterior member provided at a position surrounded by the first exterior member, and an antenna provided on an inside surface of the second exterior member. The second exterior member has a resin frame having an opening, and a resin door provided in the opening. The resin door has a rotary shaft, and the first exterior member has a come-off stopper which prevents the rotary shaft from coming off. The antenna is disposed outside the come-off stopper.

5 Claims, 10 Drawing Sheets

COMMUNICATION DEVICE WITH INTERIOR ANTENNA

BACKGROUND

1. Technical Field

The present disclosure relates to a communication device including an antenna.

2. Description of the Related Art

PTL 1 discloses a wireless communication device including an antenna. In PTL 1, antenna 340 is disposed inside lid member 3 made of resin.

CITATION LIST

Patent Literature

PTL 1: Unexamined Japanese Patent Publication No. 2005-65090

SUMMARY

The present disclosure provides a communication device which ensures downsizing of a whole device and a communication performance of an antenna even in a case where an exterior member is mainly made of metal.

The communication device of the present disclosure includes a first exterior member made of metal, a second exterior member provided at a position surrounded by the first exterior member, and an antenna provided on an inside surface of the second exterior member. The second exterior member has a resin frame having an opening, and a resin door provided in the opening. The resin door has a rotary shaft, and the first exterior member has a come-off stopper which prevents the rotary shaft from coming off. The antenna is disposed outside the come-off stopper.

The communication device of the present disclosure ensures downsizing of a whole device and a communication performance of an antenna even in a case where an exterior member is mainly made of metal.

DETAILED DESCRIPTION OF THE PREFERRED EMBODIMENTS

Hereinafter, an exemplary embodiment will be described in detail with reference to the drawings as appropriate. However, descriptions detailed more than necessary will not be given. For example, already well known matter may not be described in detail, and a substantially identical configuration may not be described again. This is to prevent the following description from being unnecessarily redundant to facilitate understanding of those skilled in the art.

Note that the inventor provides the accompanying drawings and the following description for those skilled in the art to fully understand the present disclosure, and the inventor does not intend to limit the subject matter described in the claims, by the drawings and the description.

First Exemplary Embodiment

1-1. Configuration of Digital Camera

Figure 1:
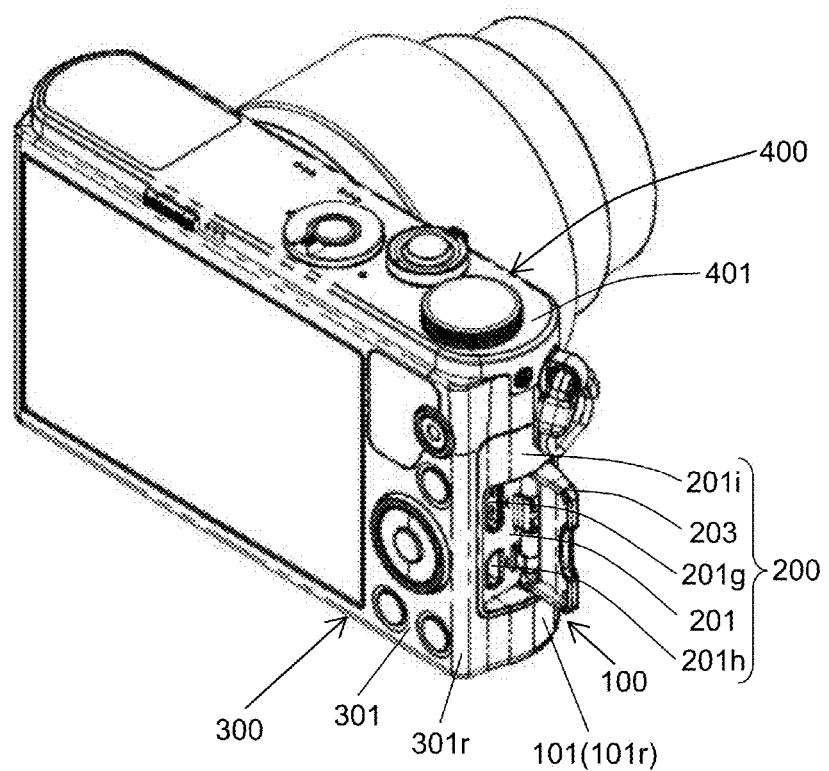
FIG. 1 is a perspective view of a digital camera of a first exemplary embodiment.

FIG. 1 is an external view of a digital camera having a wireless communication function. The digital camera having the wireless communication function is an example of a communication device.

The digital camera is configured with front unit 100, battery unit 200, rear unit 300, and top unit 400.

Front unit 100 has front casing 101 made of metal material for a better external appearance. The metal material is a magnesium alloy, for example. Front casing 101 of front unit 100 has, for a better external appearance, front curved surface 101r on area ranging from a front surface toward a side surface.

Battery unit 200 includes resin casing 201 as a frame and resin door 203. Resin casing 201 has side wall 201i on a part above resin door 203. An antenna is provided on an inner side of side wall 201i. Battery unit 200 is configured with a member mainly made of resin material to ensure a performance of the antenna. The antenna will be described later.

In resin casing 201, there are formed terminal ports 201g and 201h. In terminal ports 201g and 201h, there are provided a USB terminal, an HDMI (registered trademark) terminal, and the like.

Rear unit 300 has rear casing 301 made of metal material for a better external appearance. The metal material is a magnesium alloy, for example. Rear casing 301 of rear unit 300 has, for a better external appearance, rear curved surface 301r on area ranging from a rear surface toward the side surface. Rear curved surface 301r of rear unit 300 has a larger curvature than a curvature of front curved surface 101r of front unit 100. A large curvature of rear unit 300 ensures a space for a monitor and an operation member to be provided. Further, in the digital camera of the present exemplary embodiment, front curved surface 101r is made to have a small curvature to improve an external appearance, and rear curved surface 301r is made to have a large curvature to ensure a space and to realize downsizing as a whole.

Top unit 400 has top casing 401 made of metal material for better external appearance. The metal material is an aluminum alloy, for example.

In this case, front casing 101, resin casing 201, resin door 203, rear casing 301, and top casing 401 are, respectively, an example of exterior members.

1-2. Disposition of Flexible Antenna

Figure 2:
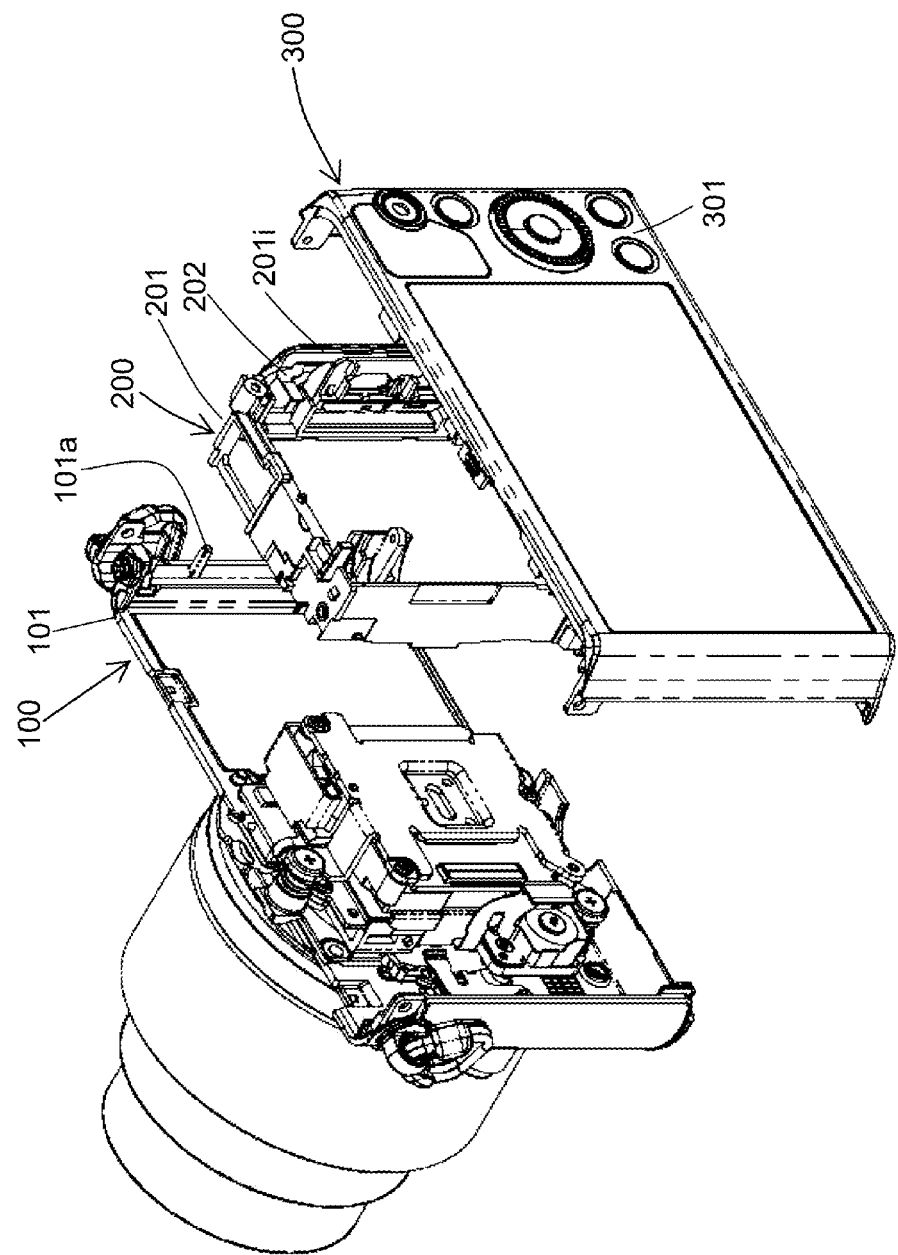
FIG. 2 is a partial development perspective view of the digital camera of the first exemplary embodiment.
Figure 3:
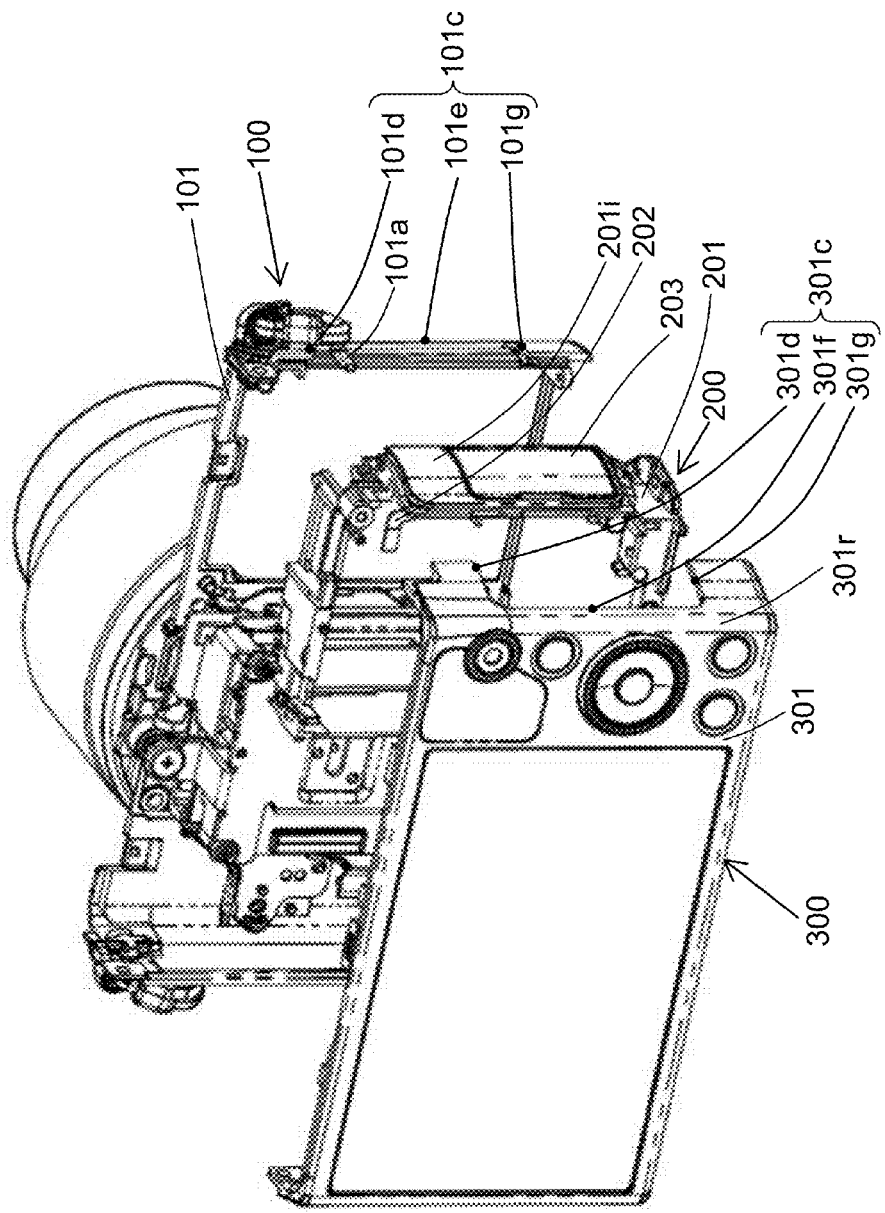
FIG. 3 is a partial development perspective view of the digital camera of the first exemplary embodiment.
Figure 4:
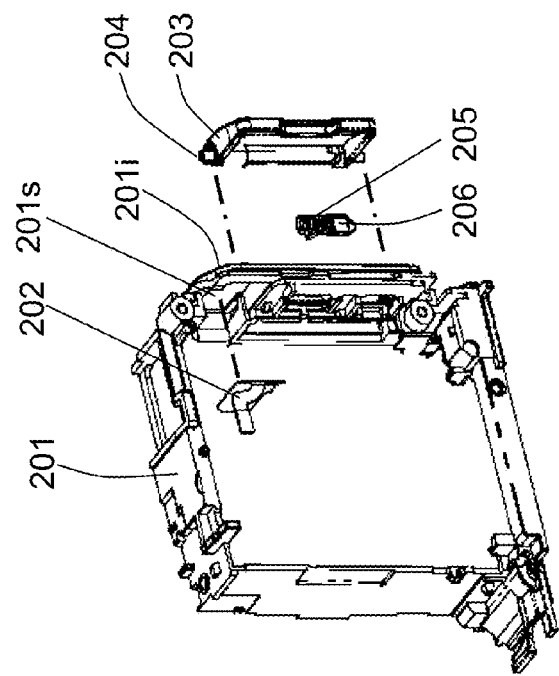
FIG. 4 is a development perspective view of a battery unit of the first exemplary embodiment.
Figure 5:
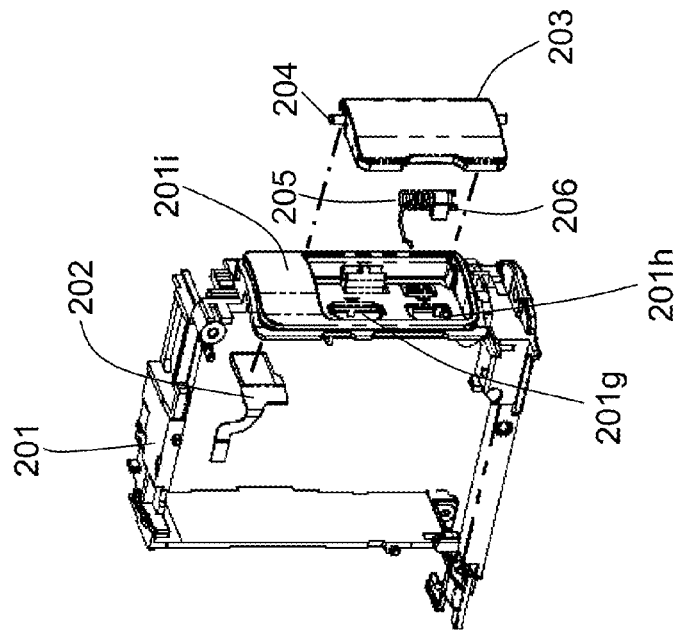
FIG. 5 is a development perspective view of the battery unit of the first exemplary embodiment.

Next, the disposition of the antenna of the digital camera having a wireless communication function will be described. FIG. 2 and FIG. 3 are partial development perspective views of the digital camera. FIG. 4 and FIG. 5 are development perspective views of battery unit 200.

As shown in FIG. 2 and FIG. 3, flexible antenna 202 as the antenna for performing wireless communication is disposed on the inner side of side wall 201i of resin casing 201. Flexible antenna 202 is made of a flexible material having flexibility.

As shown in FIG. 2 and FIG. 3, front casing 101 of the front unit 100 has, on a left side surface of the digital camera, rib 101a formed to protrude from a front side toward a rear side. Rib 101a is used to prevent metal shaft 204, functioning as a rotary shaft of resin door 203 shown in FIG. 4 and FIG. 5, from coming off.

As shown in FIG. 3, front casing 101 of front unit 100 has, on the left side surface of the digital camera, front U-shaped opening 101c opened to the rear side. Front U-shaped opening 101c has front-left-side-surface upper edge 101d, front-left-side-surface front edge 101e, and front-left-side-surface lower edge 101g. In a similar way, rear casing 301 of rear unit 300 has, on the left side surface of the digital camera, rear U-shaped opening 301c opened to the front surface side. Rear U-shaped opening 301c has rear-left-side-surface upper edge 301d, rear-left-side-surface rear edge 301f, and rear-left-side-surface lower edge 301g.

When front casing 101 and rear casing 301 are assembled, front U-shaped opening 101c and rear U-shaped opening 301c form, in combination, an approximately rectangular opening in the left side surface of an exterior casing of the digital camera.

An exterior surface of battery unit 200 is configured with side wall 201i and resin door 203 of resin casing 201. Further, the exterior surface of battery unit 200 is fitted in the approximately rectangular opening formed by front unit 100 and rear unit 300. In other words, the exterior surface configured with side wall 201i of resin casing 201 and resin door 203 is sandwiched between front U-shaped opening 101c of front casing 101 and rear U-shaped opening 301c of rear casing 301.

Figure 6:
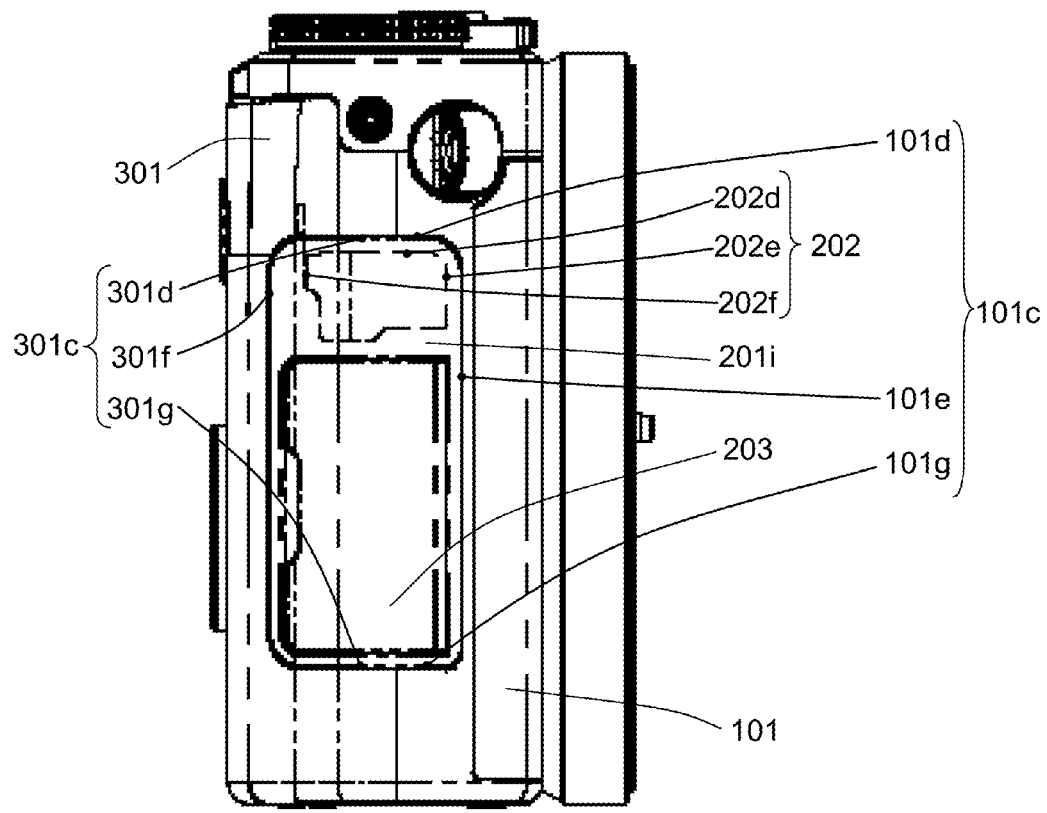
FIG. 6 is a left side view of the digital camera of the first exemplary embodiment.

FIG. 6 is a left side view of the digital camera. In the approximately rectangular opening which is formed by front U-shaped opening 101c and rear U-shaped opening 301c being assembled, the exterior surface configured with side wall 201i of resin casing 201 and resin door 203 is located.

Resin casing 201 is has a space for terminal ports 201g and 201h to be housed as shown in FIG. 4 and FIG. 5, and resin door 203 is mounted in the space. Resin door 203 is assembled with metal shaft 204, spring 205, opening and closing resin cam 206. Metal shaft 204 can be made of stainless steel, for example. Resin door 203 can be opened and closed with respect to resin casing 201.

Flexible antenna 202 is disposed in antenna space 201s on an inside surface of the side wall 201i of resin casing 201. Antenna space 201s is an area formed in resin casing 201, and is different from a space in which resin door 203 is disposed. Antenna space 201s is located on the inside surface of side wall 201i.

In FIG. 6, for easier recognition of a position of flexible antenna 202, a dashed line is used to indicate the position of flexible antenna 202, which cannot be seen from outside. Flexible antenna 202 has antenna upper edge 202d, antenna front edge 202e, and antenna rear edge 202f.

1-3. Disposition and Communication Performance of Flexible Antenna

As described above, resin casing 201, in which flexible antenna 202 is disposed, is disposed to be sandwiched by front casing 101 and rear casing 301 which are made of metal material. Thus, depending on dispositions of flexible antenna 202, communication performance of flexible antenna 202 cannot be sufficiently ensured in some cases. Further, considering the external appearance of the digital camera, it is not preferable that flexible antenna 202 is disposed at such a position that a user can see from outside. In view of the above, a description will be made on how to dispose flexible antenna 202 to ensure the communication performance while considering the external appearance.

Figure 7:
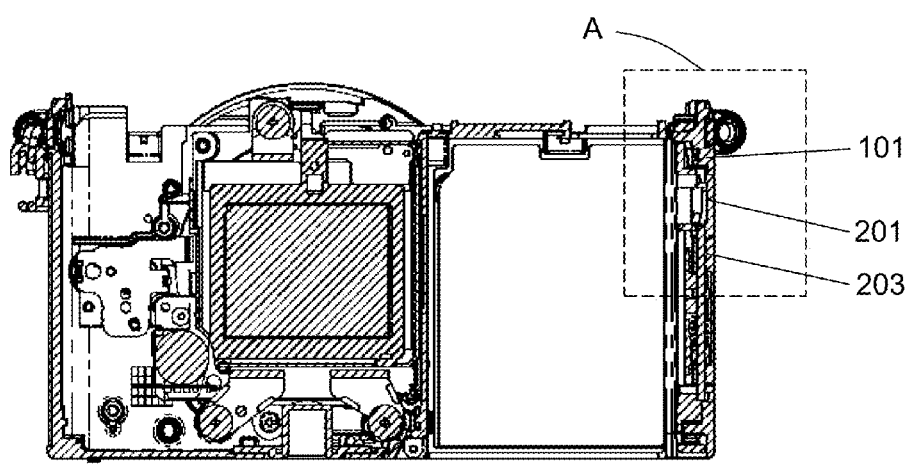
FIG. 7 is a cross sectional view of the digital camera of the first exemplary embodiment.
Figure 8:
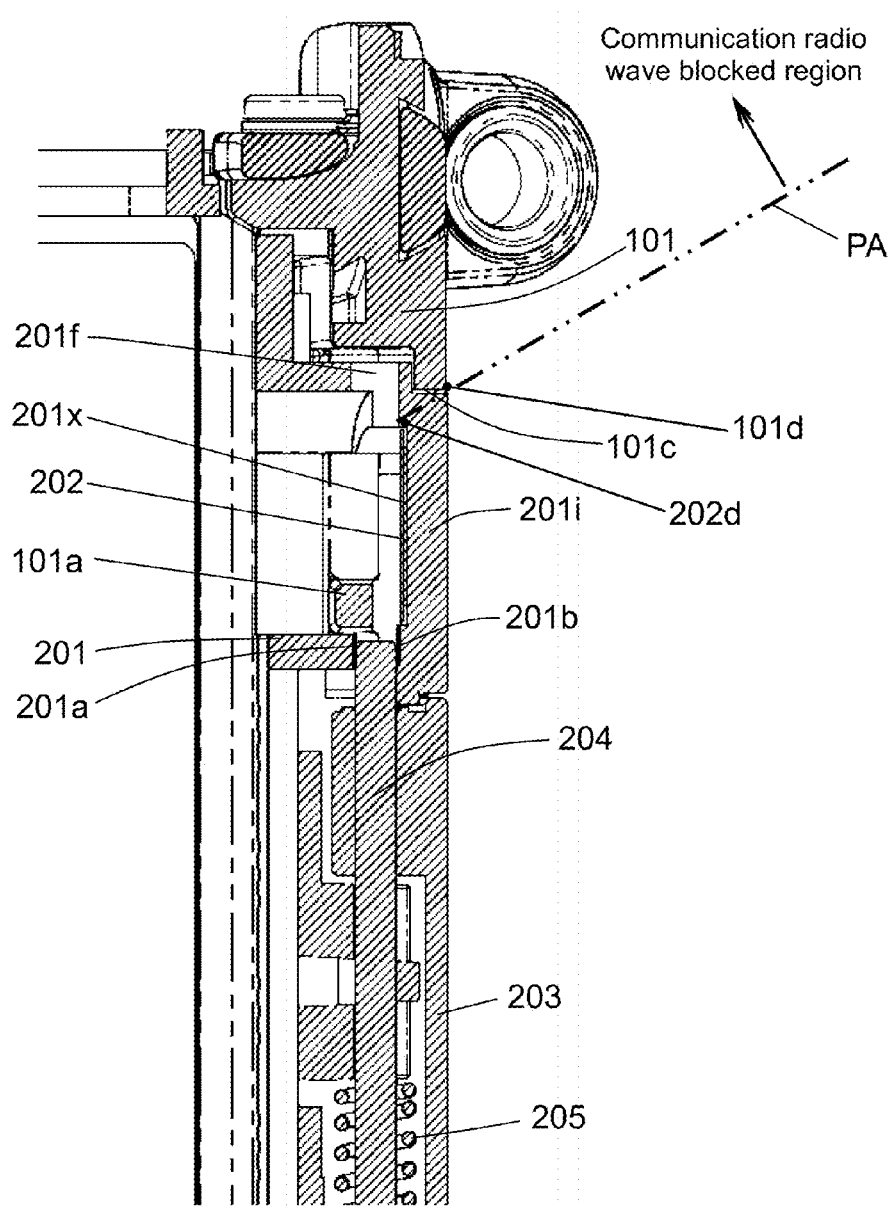
FIG. 8 is an enlarged view of part A of FIG. 7.

FIG. 7 is a vertical cross sectional view of the digital camera, and FIG. 8 is an enlarged view of part A of FIG. 7. As shown in FIG. 8, antenna disposing plane 201x is formed on the inner side of side wall 201i of resin casing 201. On antenna disposing plane 201x, flexible antenna 202 is held by sticking or the like. In the present exemplary embodiment, flexible antenna 202 is stuck and held on antenna disposing plane 201x. Further, antenna disposing plane 201x, on which flexible antenna 202 is stuck is formed outside, in a direction of the left side surface, the bearing 201b which holds metal shaft 204. Furthermore, antenna disposing plane 201x is formed outside, in the direction of the left side surface, the rib 101a of front casing 101 made of metal material. The purpose of this disposition is to make communication radio wave to flexible antenna 202 less likely to be blocked by metal shaft 204 and rib 101a.

In addition, because antenna disposing plane 201x is formed outside, in the direction of the left side surface, bearing 201b holding metal shaft 204, when metal shaft 204 is removed for repair or the like, metal shaft 204 can be easily removed without interfering with antenna disposing plane 201x. Concretely speaking, metal shaft 204 is, after being released from the come-off stop by rib 101a, removed from resin casing 201 and resin door 203 through between bearings 201a and 201b and then through come-off hole 201f.

Flexible antenna 202 is stuck and held on antenna disposing plane 201x. On a part above side wall 201i of resin casing 201, front casing 101 made of metal material is located. Here, with the plane (chain double-dashed line PA shown in FIG. 8) connecting antenna upper edge 202d of flexible antenna 202 and front-left-side-surface upper edge 101d of front casing 101 as a border, a communication radio wave blocked region is formed on the side indicated by the arrow. This is because the communication radio wave of flexible antenna 202 is blocked by front casing 101 made of metal in the communication radio wave blocked region. Thus, communication radio wave blocked region can be made narrow by disposing flexible antenna 202 as close as possible to the outer surface of the left side surface of front casing 101 so that a sufficient communicable area can be ensured. As described above, FIG. 8 illustrates the relation between resin casing 201 and front casing 101; however, on a part above side wall 201i of resin casing 201, rear casing 301 made of metal material is also located as shown in FIG. 3 and FIG. 6. In addition, a communication radio wave blocked region is also formed in association with the relation between antenna upper edge 202d of flexible antenna 202 and rear-left-side-surface upper edge 301d of rear casing 301, and a similar discussion can be done for this communication radio wave blocked region as in the case of above described front-left-side-surface upper edge 101d.

Figure 9:
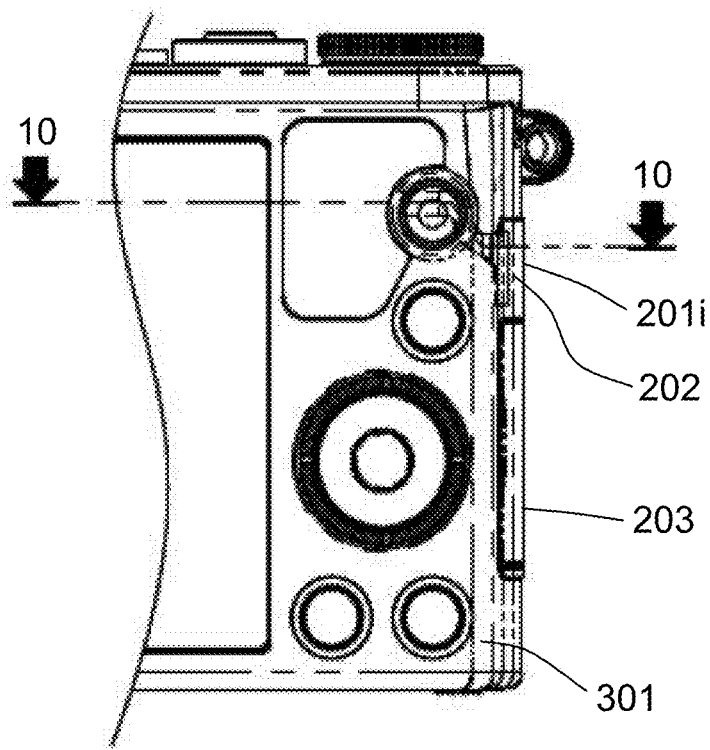
FIG. 9 is a partial rear view of the digital camera of the first exemplary embodiment.
Figure 10:
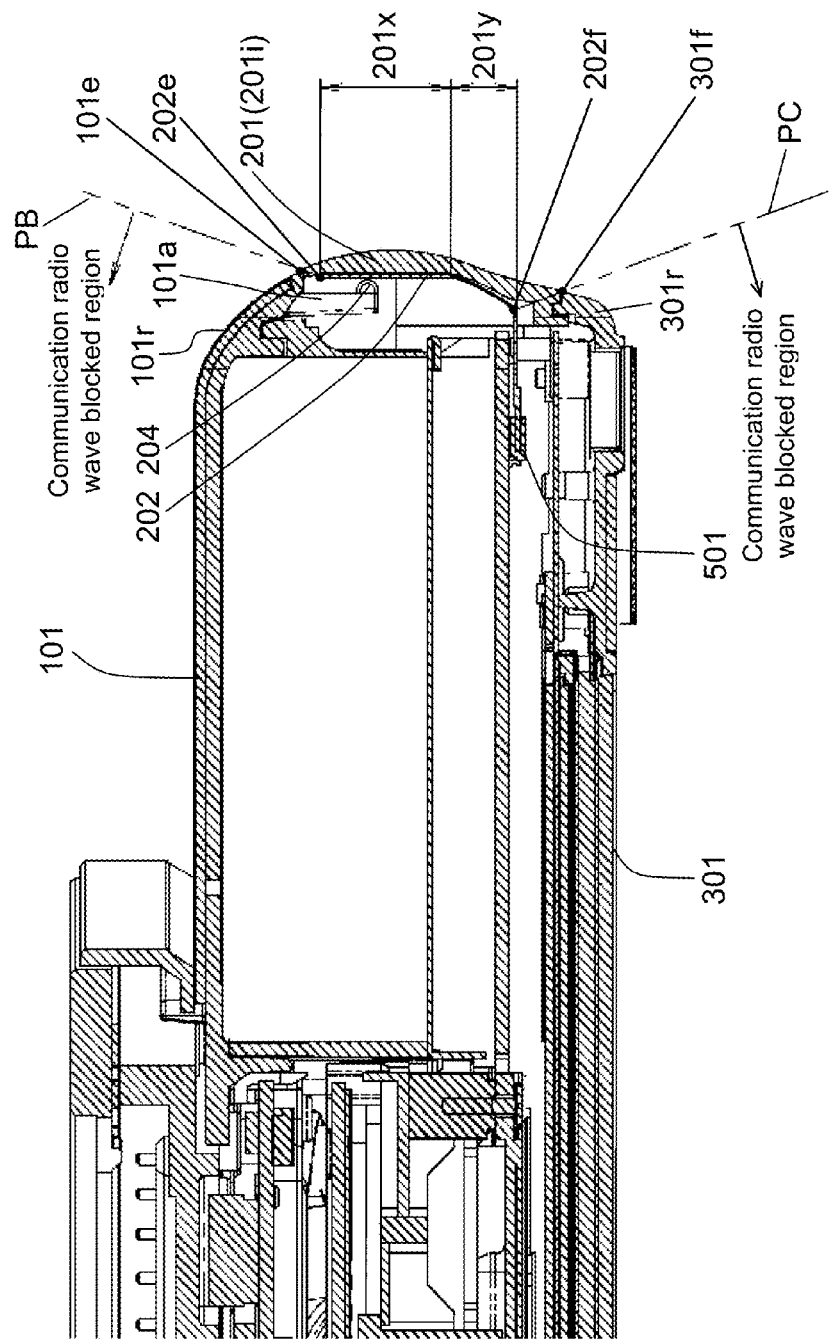
FIG. 10 is a cross sectional view cut along line 10-10 of FIG. 9.

Next, a description will be made on how flexible antenna 202 is disposed with respect to a horizontal direction. FIG. 9 is a partial rear view of the digital camera, and FIG. 10 is a cross sectional view along line 10-10 of FIG. 9. In FIG. 9, for easier recognition of a position of flexible antenna 202, a dashed line is used to indicate the position of flexible antenna 202, which cannot be seen from outside.

As shown in FIG. 10, resin casing 201 has antenna disposing plane 201x and antenna disposing curved surface 201y which are formed on the inside surface of side wall 201*i*, in order from a side of front casing 101 toward a side of rear casing 301. Further, flexible antenna 202 is stuck on antenna disposing plane 201*x* and antenna disposing curved surface 201*y*. Antenna disposing plane 201*x* is made flat so that flexible antenna 202 is easily stuck with double-sided tape and a high sticking strength is ensured. Further, antenna disposing curved surface 201*y* is made curved to guide flexible antenna 202 to connector 501.

Flexible antenna 202 is stuck and held on antenna disposing plane 201*x* and antenna disposing curved surface 201*y*. In addition, on the front side of side wall 201*i* of resin casing 201, front casing 101 made of metal material is located. Further, on the rear side of side wall 201*i* of resin casing 201, rear casing 301 made of metal material is located. Here, with the plane (chain double-dashed line PB shown in FIG. 10) connecting antenna front edge 202*e* of flexible antenna 202 and front-left-side-surface front edge 101*e* of front casing 101 as a border, a communication radio wave blocked region is formed on the side indicated by the arrow. This is because the communication radio wave of flexible antenna 202 is blocked by front casing 101 made of metal in the communication radio wave blocked region. Further, with the plane (chain double-dashed line PC shown in FIG. 11) connecting antenna rear edge 202*f* of flexible antenna 202 and rear-left-side-surface rear edge 301*f* of rear casing 301 as a border, a communication radio wave blocked region is formed on the side indicated by the arrow. This is because the communication radio wave of flexible antenna 202 is blocked by rear casing 301 made of metal in the communication radio wave blocked region. Thus, the communication radio wave blocked region can be made narrow by disposing flexible antenna 202 as close as possible to the outer surface of the left side surface of front casing 101 and rear casing 301 so that a sufficient communicable area can be ensured.

In the above example, the communication radio wave blocked region is formed with the plane connecting antenna rear edge 202*f* and rear-left-side-surface rear edge 301*f* as a border; however, this case is just an example. Depending on strengths of transmitted and received signals of flexible antenna 202, it may be possible to transmit and receive signals by antenna disposing curved surface 201*y*, even if the signals are in the communication radio wave blocked region.

In addition, as shown in FIG. 8 and FIG. 10, antenna disposing plane 201*x* is disposed outside the rib 101*a*, which prevents metal shaft 204 from coming off. This disposition can make the communication radio wave to flexible antenna 202 less likely to be blocked by rib 101*a*. Further, rib 101*a* is disposed on the inside of flexible antenna 202. With this disposition, even if flexible antenna 202 is peeled off from antenna disposing plane 201*x*, flexible antenna 202 can be kept outside the rib 101*a* so that the performance of flexible antenna 202 can be ensured.

Second Exemplary Embodiment

Figure 11:
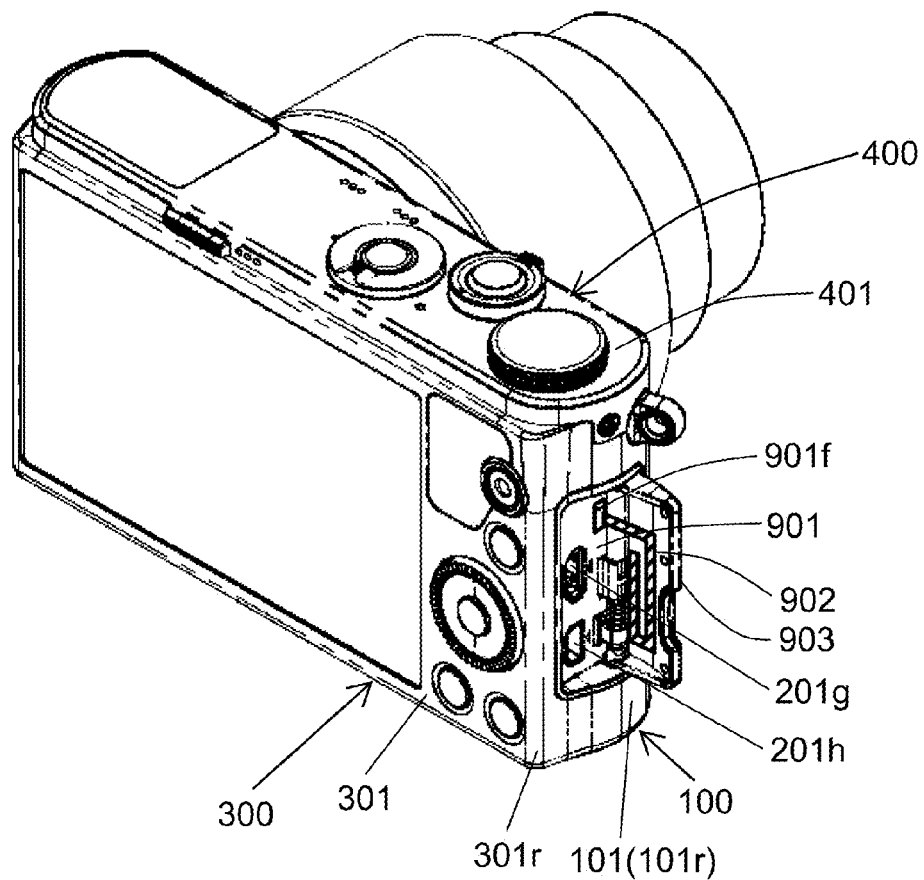
FIG. 11 is a perspective view of a digital camera of a second exemplary embodiment.

Second exemplary embodiment is an example aiming at further improvement of the communication performance. FIG. 11 is a perspective view of a digital camera of the second exemplary embodiment.

As shown in FIG. 11, flexible antenna 902 is disposed on an inside surface of resin door 903. In this case, because flexible antenna 902 is disposed outside the metal shaft functioning as a rotary shaft of resin door 903 and a rib for preventing the come-off of the metal shaft, it is easy to ensure the communication performance. Further, even if a communication environment is bad, the communication performance can be easily ensured when a user opens resin door 903. In this disposition, flexible antenna 902 is connected with connector 501 through connection hole 901*f* made in a space for housing resin casing 901. Alternatively, flexible antenna 902 may be insert molded into resin door 903.

Other Exemplary Embodiment

As described above, the exemplary embodiments have been described as examples of a technique disclosed in the present application. For this purpose, the attached drawings and the detailed description are provided. However, the technique according to the present disclosure is not limited to the above exemplary embodiments, and can be applied to exemplary embodiments which include modification, replacement, addition, and removal if necessary.

Therefore, the components described in the attached drawings and the detailed description may include, for the sake of exemplifying the above technique, not only components necessary to solve the problems but components unnecessary to solve the problems. For this reason, those unnecessary components should not be recognized to be necessary just because those unnecessary components are described in the attached drawings and the detailed description.

In addition, because the above exemplary embodiments are for exemplifying the technique disclosed in the present disclosure, various modification, replacement, addition, and removal can be made within the scope of the appended claims and the equivalent scope.

INDUSTRIAL APPLICABILITY

The present disclosure can be applied to communication devices including an antenna. Concretely, the present disclosure can be applied to digital cameras, smartphones, video cameras, and the like.

What is claimed is:

1. A communication device comprising:
a first exterior member made of metal;
a second exterior member disposed at a position surrounded by the first exterior member; and
an antenna disposed on an inside surface of the second exterior member,
wherein the second exterior member has: a resin frame having an opening; and a resin door provided in the opening,
the resin door has a rotary shaft,
the first exterior member has a come-off stopper which prevents the rotary shaft from coming off,
the come-off stopper is disposed in a space surrounded by the first exterior member and the second exterior member, and
the antenna is disposed more outward than the come-off stopper.

2. The communication device according to claim 1, wherein the antenna is disposed in a position different from an area in which the resin door of the second exterior member is disposed.

3. The communication device according to claim 1, wherein the first exterior member has a first curved surface on an area ranging from a front surface to a side surface of the communication device, and a second curved surface which has a curvature larger than a curvature of the first curved surface on an area ranging from a rear surface to a side surface of the communication device, and the second exterior member includes a flat surface part, on which the antenna is provided, on an inside surface of the second exterior member.

4. The communication device according to claim 1, wherein the second exterior member includes: a flat surface part on an inside surface of a front side of the second exterior member; and a curved surface part adjacent to the flat surface part, wherein the antenna is disposed on the flat surface part and the curved surface part.

5. The communication device according to claim 1, wherein the antenna is disposed on an inside surface of the resin door.

* * * * *